United States Patent [19]
Britt et al.

[11] Patent Number: 5,666,297
[45] Date of Patent: Sep. 9, 1997

[54] PLANT SIMULATION AND OPTIMIZATION SOFTWARE APPARATUS AND METHOD USING DUAL EXECUTION MODELS

[75] Inventors: Herbert I. Britt, Cambridge; Amol P. Joshi, Marlboro; Vladimir Mahalec, Sudbury; Peter C. Piela, Brighton; Swaminathan Venkataraman, Waltham, all of Mass.

[73] Assignee: Aspen Technology, Inc., Cambridge, Mass.

[21] Appl. No.: 242,269

[22] Filed: May 13, 1994

[51] Int. Cl.$^6$ ..................................................... G06F 17/11
[52] U.S. Cl. ........................... 364/578; 364/151; 364/492; 395/500; 395/920
[58] Field of Search ............................ 364/578, 492, 364/495, 149, 150, 151; 396/500, 920

[56] References Cited

U.S. PATENT DOCUMENTS

| | | | |
|---|---|---|---|
| 4,069,675 | 1/1978 | Adler et al. | 60/667 |
| 4,297,848 | 11/1981 | Silvestri | 60/660 |
| 4,604,718 | 8/1986 | Norman et al. | 364/578 |
| 4,977,529 | 12/1990 | Gregg et al. | 364/492 |
| 5,047,947 | 9/1991 | Stump | 364/578 |
| 5,062,066 | 10/1991 | Scher et al. | 364/578 |
| 5,081,591 | 1/1992 | Hanway et al. | 364/492 |
| 5,331,579 | 7/1994 | Maguire et al. | 364/578 |
| 5,347,466 | 9/1994 | Nichols et al. | 364/492 |
| 5,402,367 | 3/1995 | Sullivan et al. | 364/578 |
| 5,526,281 | 6/1996 | Chapman et al. | 395/920 |

OTHER PUBLICATIONS

"Use of RT–OPT and User's Notes," Users Manual by Aspen Technology (1993/1994).

*Primary Examiner*—Kevin J. Teska
*Assistant Examiner*—Tyrone V. Walker
*Attorney, Agent, or Firm*—Hamilton, Brook, Smith &Reynolds, P.C.

[57] ABSTRACT

A software system simulates and optimizes a processing plant design. The software system includes a plurality of equipment models for simulating each piece of equipment in the processing plant design. A sequential modular simulation routine executes the equipment models in a first mode to define a first set of values of the operating parameters of the processing plant design. An optimization routine executes the equipment models in a second mode. The optimization routine utilizes the first set of values for the operating parameters from the sequential simulation routine and subsequently determines values of the operating parameters at which the processing plant design is optimized. The equipment models after execution by the sequential simulation routine and optimization routine store the first and second sets of values for the operating parameters in a common plant model file. Hence, the plant model file holds values computed during the sequential simulation routine as well as those computed during the optimization routine.

12 Claims, 3 Drawing Sheets

PLANT SIMULATION AND OPTIMIZATION SOFTWARE APPARATUS AND METHOD USING DUAL EXECUTION MODELS

BACKGROUND OF THE INVENTION

Process engineering involves the design of a wide variety of processing plants and processes carried out therein. Such processes include, but are not limited to, chemical, petrochemical, refining, pharmaceutical, polymer, plastics and other process industries. In process engineering, the use of computer based models to develop and evaluate new processes, design and retrofit plants, and optimize the operation of existing plants is rapidly becoming a standard. At every stage of process design, development and operation, rigorous models generated by process simulation software systems can be used to make better engineering and business decisions.

In a process simulation software system, the performance of a process industry plant in which there is a continuous flow of materials and energy through a network of process units (i.e., equipment such as distillation columns, retaining vessels, heating units, pumps, conduits etc.) is simulated. Typically, the processing simulation software features computer models which allow process engineers to simulate (and sometimes optimize) the operation of various pieces of equipment used in a proposed or existing manufacturing process. The end results from the simulation software system provide a showing of the simulated (and possibly optimized) performance of the plant under various conditions and estimate of the capital and operating cost of the plant and its profitability.

Generally, simulation and optimization of a process plant model is carried out by one of two fundamentally different approaches:

1. Sequential modular simulation of the plant model, with an optimization algorithm ("optimization block") adjusting the optimization variables after each converged simulation of the complete plant model.
2. Simultaneous solution of the entire plant model, which solves the plant model and optimizes its conditions at the same time.

Sequential Modular Simulation

The first of these approaches (sequential modular simulation) is a method of solving the plant model by executing the models of the individual process equipment in the same sequence as the direction of the flow in the plant. Starting from the feed entry point, the first equipment which processes the feed is simulated for the specified operating conditions. The result of the equipment simulation are the predicted products from the equipment. Processing of each of the products in the succeeding downstream equipment is simulated next, again under the specified conditions for the downstream equipment. Serial simulation of the plant proceeds in this manner (one process unit/piece of equipment at a time in serial order) until the last piece of equipment is simulated, i.e. the downstream end of the plant is reached. If there are some streams which are recycled (i.e., returned upstream to be processed again), then the computation follows the recycle flow and repeats the computation for the recycle loop equipment. The above procedure is repeated until all recycle loops are converged.

Given a sequential simulation model of a process plant, one can optimize it by converging the plant model and then perturbing it to find out the most desirable response of the model to the plant changes.

There are several advantages to such an approach to plant optimization:

1. Sequential modular method simulates one process unit at a time, thereby maximizing the utility of the available computing hardware.
2. Highly specialized solution algorithms can be applied to the simulation of a specific process unit model, facilitating convergence of some very difficult models.
3. Modular structure of the software has endorsed a paradigm where a user works with one process unit at a time, specifying operating conditions or product quality.

However, sequential modular simulators perform well only under the following conditions:

1. Plant model is essentially serial in structure, i.e.
    there are no recycles
    there is no significant integration between energy and material flows.
2. Model specifications do not force repetitive execution of the large sections of the model.
    there are no flowsheet specifications which require manipulation of some variables upstream to adjust the variables downstream.

For plants models with the above characteristics, the sequential modular approach simulates the plant quickly. In addition, the existence of the heuristic solving procedures internal to the unit (equipment) models enables the models to converge with minimal information, i.e. only the engineering specification of the equipment is needed.

If the process plant model does not have the characteristics described above, then the convergence behavior depends to some extent (i) on the ability of the user to provide initial guesses of the values of process variables, (ii) and on the quality of the convergence algorithms in the simulation system.

Design and implementation of the sequential modular simulators has addressed the above issues by introducing "convergence" blocks for recycle loops and for flowsheet specifications. These convergence methods perform well if there is only one iterative variable in the process. As the number of iterative variables increases, one needs to resort to iterative procedures which require derivative information to converge the flowsheet.

The need to use derivative information in convergence of several iterative variables requires that the derivatives be evaluated by numerical perturbation of the flowsheet, since the unit models in the sequential modular simulator do not provide derivative information.

Numerical evaluation of the derivatives results in inaccurate derivatives due to:

internal convergence loops in the unit operation models having only a final tolerance; often, the convergence loops within different units have different tolerances.

recycle loops, energy integration loops, design specifications all converging with individual tolerances, which are often different from each other.

In addition, the iterative procedure uses "squashed" (i.e., compressed or condensed) derivative information, which essentially corresponds to a (numerically) chain-ruling over the large section of the flowsheet. Such methods inherently display non-robust convergence.

One common way to optimize a process flowsheet is to add an optimization procedure around the sequential modular flowsheet. This is typically implemented as an "optimization block", containing an optimization algorithm.

Similarly to the convergence of the multiple flowsheet specifications, the optimization procedure requires accurate derivative information, which can be obtained only numerically. This need to obtain the derivatives represents a major limitation of the sequential simulators with an optimization block, since:

- derivatives evaluated numerically from the models with the internal convergence loops are inaccurate,
- excessive execution times are required for evaluation of derivatives in the flowsheets with "upstream" specification or nested recycle loops.

Simulation by Simultaneous Solution of the Plant Model

In the second of the above-mentioned fundamental approaches, simulation by a simultaneous solution of the entire plant model solves all plant model equations at the same time. In other words, there are no distinct simulation computations for individual equipment. Instead, the entire plant model is simulated at once.

Briefly, simulation by simultaneous solution of the plant model employs equipment models written in a form that can be used to solve various problems from the same model. The same model can be used to solve the following problems:

- for a given feed and operating conditions, predict the plant product;
- for a given set of product and the operating conditions, predict the feed which is entering the plant;
- for a given set of product and the feed, estimate the operating parameters of the plant;
- minimize simultaneously deviations between model predicted variables and the plant measurements (data reconciliation and parameter estimation).

Such simulators/optimizers employ models which do not contain any internal convergence loops. All of the plant model variables are "visible" to the solver. Hence, one can impose limits (constraints) on:

- either variables which are internal to the process units (i.e., reactor wall temperatures, tray liquid loading), or
- on the stream measured variables (e.g., %ethane in an ethylene stream), or
- on the model parameters (e.g., heat transfer coefficient in an exchanger).

Further, the simultaneous solution models can be of any rigor. Some equipment models may be rigorous, some may be simplified models, or all equipment models may be rigorous models.

On a straight-through simulation, without nested specification or recycle loops, the sequential modular simulator (of the first fundamental approach) with its specialized solution methods for each unit will be faster than the simultaneous solving simulator/optimizer (the second fundamental approach). However, when the process flowsheet has several specifications or nested recycle loops, then the simultaneous solving approach is significantly faster. The difference in performance increases dramatically as the number of degrees of freedom (optimization variables) increases.

Further strengths and weaknesses of the two above-discussed approaches are as follows.

Sequential modular simulation can converge the simulation case of the flowsheet from a set of engineering specifications and a limited number of initial guesses. This is the strongest point of the sequential modular simulation.

A sequential modular simulator with an optimizer is limited to a small number of optimization variables, since it requires numerical evaluation of the derivatives, which results in non-robust performance and large execution times as the number of variables increases.

A sequential modular model with an optimizer is very sensitive to changes in the feed rate and may require frequent "re-tuning" to converge.

A sequential modular simulator can not estimate parameters and reconcile the plant data from the same model as the model used for optimization.

On the other hand, simultaneous simulation systems need good initial guesses for many variables in order to achieve convergence.

The simultaneous simulation system is not limited in the number of optimization variables.

A simultaneous simulator can use a consistent set of scales over a wide range of conditions.

A simultaneous simulator can use the same model to:
reconcile plant data,
estimate plant parameters,
simulate plant operation,
optimize plant operation.

In contrast, a sequential modular system can not use the same model for all of the above.

The simultaneous simulation model can be used to estimate plant feed composition, based on the internal measurements of the process units (e.g., temperatures on the distillation trays). A sequential modular system can perform this task only for a limited number of components and a relatively simple plant model (the number of working parameters is otherwise too large).

The simultaneous simulation model can accept explicit constraints on the internal model variables (e.g., reactor wall temperature), which is not possible in the closed form models employed in the sequential modular simulation.

Given the above, there is a need for improvement in software systems used for simulating and optimizing process plant designs.

SUMMARY OF THE INVENTION

Applicants have discovered that the better software system for simulating and optimizing process plant designs is one which:

a) solves the initial plant model through sequential modular simulation. This generates an initial point, and b) generates an equation oriented plant model which is initialized from the solution in a). This equation oriented model is then used for data reconciliation, parameter estimation, optimization, and simulation.

Such a system provides an improvement over the prior art.

By way of summary, there are two basic parts to the present invention. The first basic part of the present invention enables the same equipment model to be used in both (i) a simulation by a sequential modular computation, and (ii) the simultaneous simulation (or optimization) of the entire plant model. In other words, each equipment model can be executed in two modes as follows.

Mode A:

Given equipment operating parameters and the feed conditions, the equipment (process unit) model solves for the product streams of the corresponding piece of equipment. This means that the equipment model can be executed as a part of the sequential modular computation of the plant model.

Mode B:

An equipment model is able to participate in the simultaneous simulation of the entire plant model by computing items which are needed by the simulator which solves the total plant model.

To that end, each equipment model of the present invention has a dual execution mode capability, as described in detail below.

The second basic part of the present invention is that each equipment model, at the end of the plant simulation or optimization, stores the results to a plant model file, which is used with both modes of the equipment model execution.

This part of the present invention enables the solution of the sequential modular simulation and the solution of the simultaneous simulator/optimizer to be mutually shared. Hence, initial plant simulation is carried out by a sequential modular simulation. The results are stored in the plant model file. The results of the sequential modular simulation are then used as the initial, starting point for the simultaneous simulation and optimization of the plant model.

Results obtained by the simultaneous simulation of the plant model are also stored in the plant model file. Therefore, one can use these results to run a sequential modular plant simulation.

In the present invention, initial simulation of a desired process plant by a sequential modular routine enables the convergence of the plant model (i.e., solution thereof) with a very small number of specifications or initial guesses entered by the plant model developer/engineer. This solution then serves as the starting point for the optimization of the plant model by the simultaneous simulation routine. Since the simultaneous simulation routine starts from a feasible point (solution by the sequential modular routine), the simultaneous simulator/optimizer converges to an optimum point in a robust manner.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

As described herein, the present invention is intended to be used as a part of the software architecture in a computer software system for modeling, simulation, parameter estimation, data reconciliation and optimization of desired plants in the process industries (chemical, petrochemical, refining, pharmaceutical, polymers, plastics and other process industries). One such process modelling software 50 and interface 52 thereto is described in U.S. Pat. No. 5,008,810 incorporated herein by reference. This relationship between the present invention software system 30 and the process modelling software 50 (and interface 52) is illustrated in FIG. 2 discussed in detail later.

Figure 3:
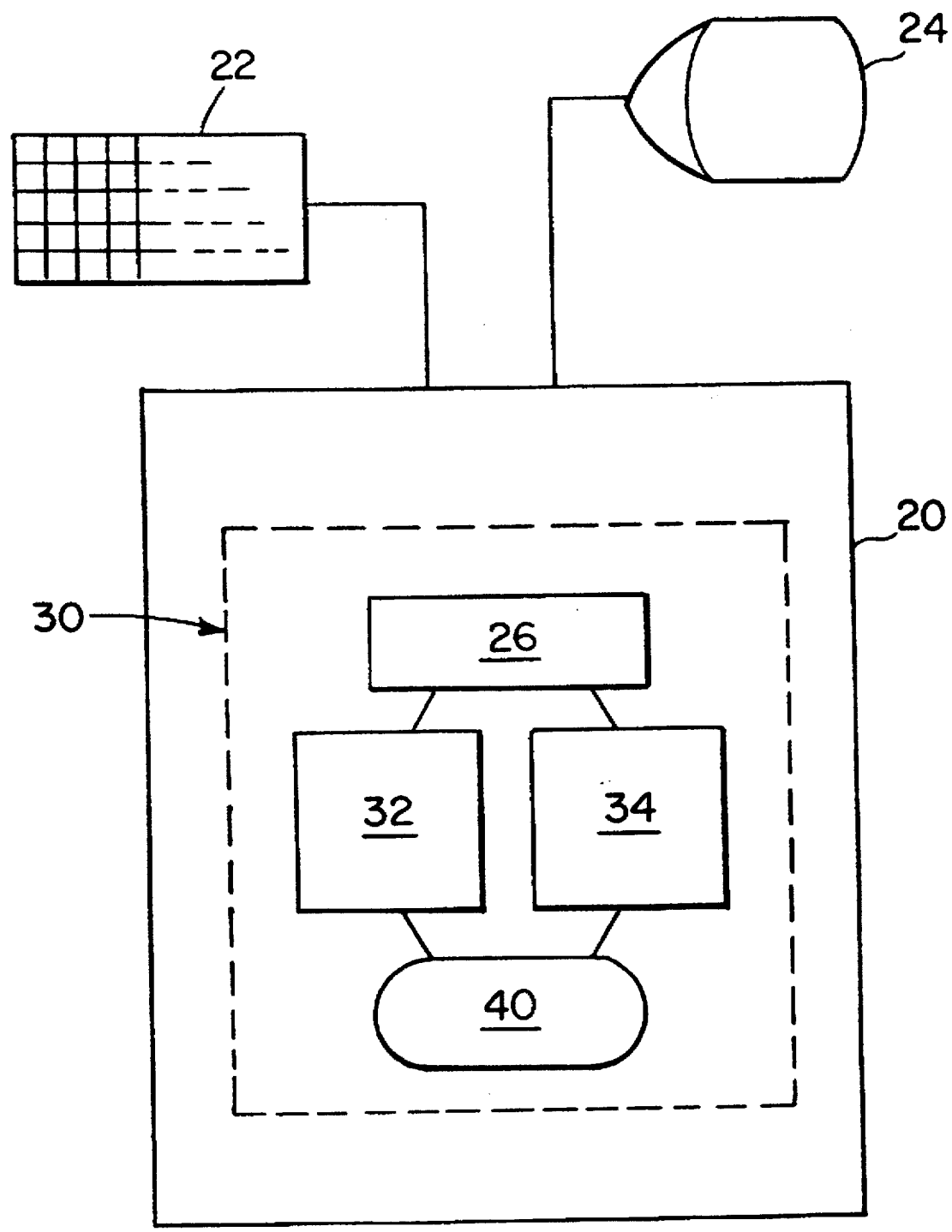
FIG. 3 is a block diagram of a digital processing system in which an embodiment of the present invention is operated.

In general, a computer software system 30 embodying the present invention is operated on a digital processor 20 typically in a user-interactive manner (FIG. 3). As such, the digital processor 20 is coupled to input/output devices such as a keyboard 22 and monitor 24 as shown in FIG. 3. Software system 30 is basically formed of (i) a sequential modular procedure 32, (ii) simultaneous simulator/optimizer 34 and (iii) model interface 26 as the operating/executable parts, and (iv) plant model file 40 as a shared main storage area for the working parts.

By way of overview, software system 30 calls model interface 26 to interactively define equipment models 10 with a user. In running a simulation, software system 30 calls or passes control to sequential modular procedure 32. In response sequential modular procedure 32 executes each equipment model 10 (one at a time in serial downstream order) in a first mode (Mode A). Upon completion, processor control is passed back to the main working portion of software system 30. Subsequently, software system 30 calls or passes processor control to simultaneous simulator/optimizer 34 for simulating and optimizing the subject plant design or plant model. Using ending variable and parameter values from sequential modular procedure 32 as a starting point, simultaneous simulator/optimizer 34 executes the equipment models 10 in a second mode (Mode B). The results are a set of equation values that describe the optimized operating conditions of each piece of equipment in the desired process plant design. These results along with the results of sequential modular procedure 32 are stored in common plant model file 40.

Figure 1:
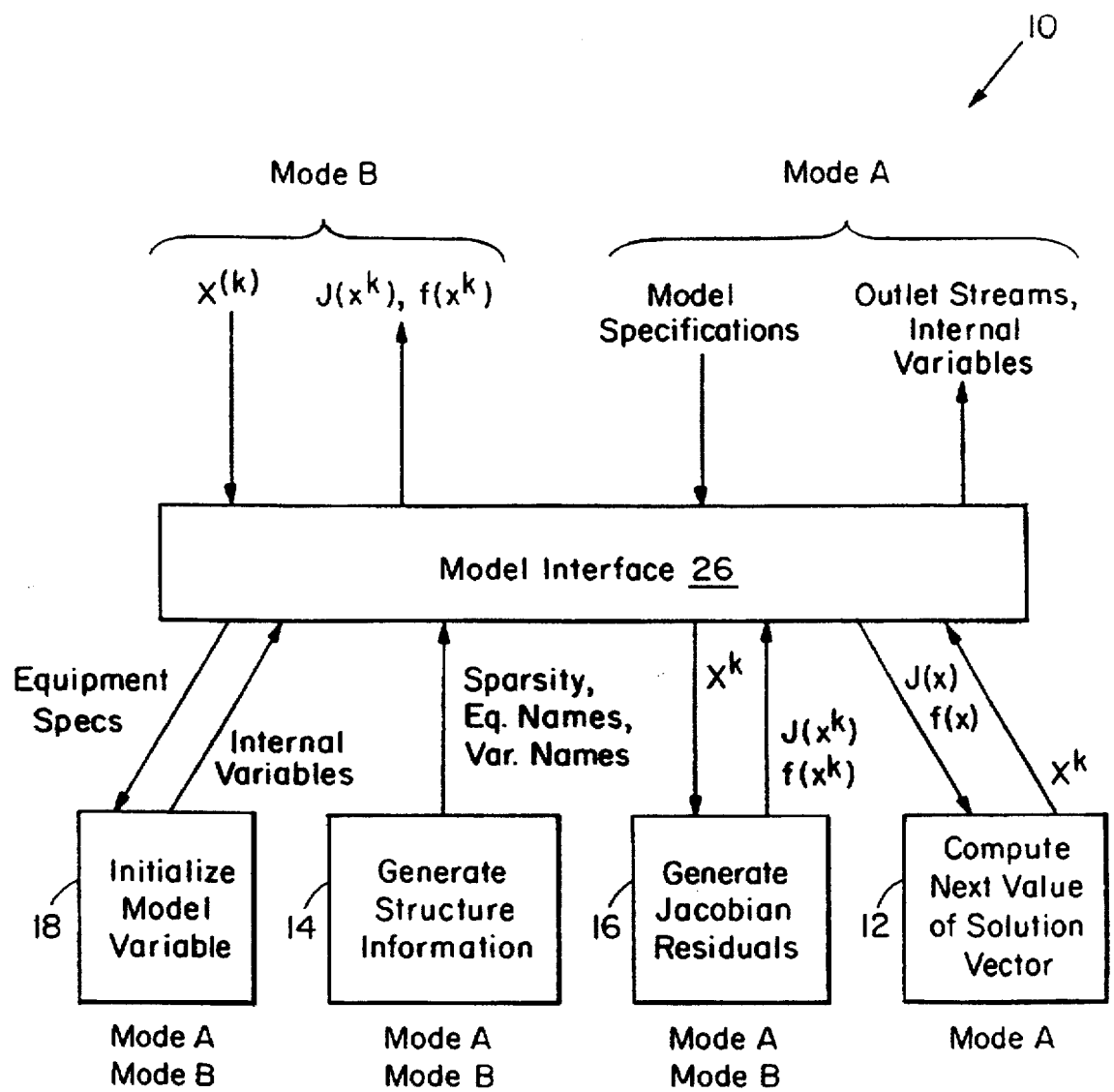
FIG. 1 is a block diagram of an equipment model of the preferred embodiment of the present invention.
Figure 2:
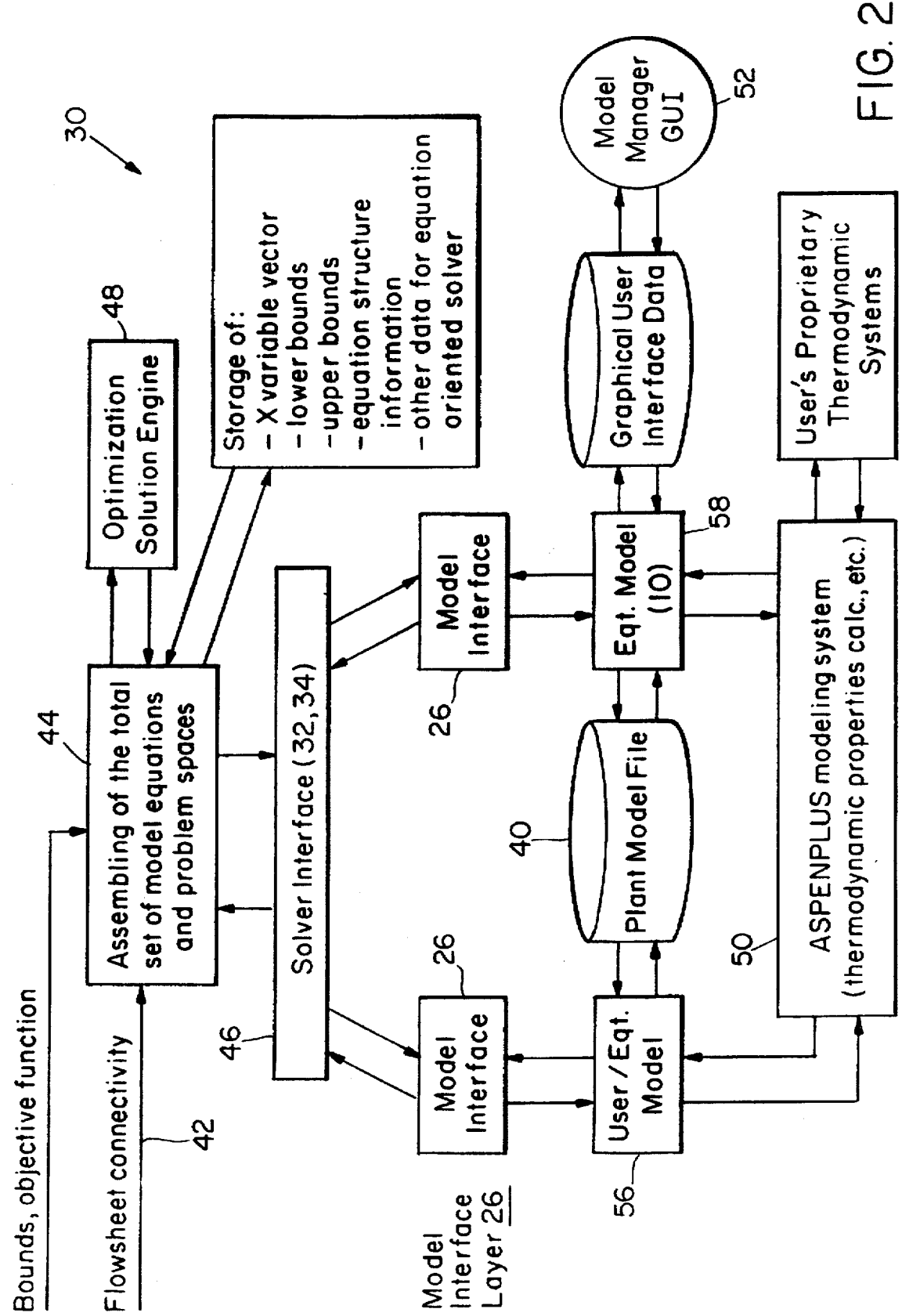
FIG. 2 is a block flow diagram of a software system embodying the present invention.

The foregoing operation of software system 30 is described in more detail below with reference to a preferred embodiment as illustrated in FIGS. 1 and 2.

Illustrated in FIG. 1 is block diagram of an equipment model 10 employed in the preferred embodiment of the present invention. For each piece of equipment in a desired process plant design (or plant model) there is a corresponding equipment model 10. Each equipment model 10 describes its corresponding piece of equipment by a collection of equations which quantitatively (i.e., mathematically) define the behavior (operation) of the equipment in a process plant. Solving this set or system of equations within a model 10 simulates the corresponding piece of equipment, and solving the model equations across all models 10 in a plant design simulates the whole process plant. Further, each model 10 is an executable portion of code, written for execution by a digital processor in one of two modes (Modes A and B) as described in more detail below. Thus, each equipment model 10 is considered to be a dual execution model.

In the preferred embodiment, an equipment model 10 is implemented by the following (see FIG. 1):

(a) a computational procedure 16 which computes the residuals of the model equations, which are written in the form:

$$f(\vec{x}) = residual$$

Given a vector of values for $\vec{x}$, the procedure 16 computes the residuals. If the values for $\vec{x}$ solve the model equations, then the residual is equal to zero (which is the case at the solution point). Procedure 16 also computes the Jacobian matrix values for the equipment model 10, given some values for the x vector.

(b) a procedure 14 which determines the structural data about the equipment model 10:
 number of variables,
 number of equations,
 names of variables,
 names of equations,
 number of non-zero entries in the Jacobian matrix (i.e., matrix of the first partial derivatives of the model equations with respect to the variables) for the equipment model 10, (c) a procedure 12 which computes the next iteritive values of vector x.

(d) model parameters (i.e. fixed values which do not change, such as a reactor diameter).

(e) a model initialization procedure 18, which generates the initial values of the model variables when the model is executed for the first time in the sequential modular mode.

Mode A Execution of the Equipment Model 10:

Each equipment model 10 is always executed first in the sequential modular computation mode (Mode A). This permits the model writer to include in the initialization procedure 18 any desired heuristics which may be needed to ensure the model convergence from the engineering specification of the corresponding plant equipment given by the user.

When the equipment model 10 is executed by the digital processor 20 (more specifically by the sequential modular procedure 32 of software system 30), the model interface 26 (see FIG. 1) performs the following functions:

(a) request generation of the structural data, (b) request initialization of the model variables, (c) set convergence parameters for the computational procedure 12 which is used in conjunction with the model interface 26, (d) start iteration count for the number of iterations required to solve the model, (e) set the current value of the vector of model variables ($\vec{x}$) to the initialized values, (f) execute the following iteration cycle (steps 1 to 6) until converged:
  1. request the residual values for the current value of x vector,
  2. if converged, leave the interaction cycle, otherwise proceed,
  3. request Jacobian matrix for the current value of x vector,
  4. transfer the Jacobian matrix and the residuals to the solver 46 (FIG. 2),
  5. request from the solver 46 to compute the next iteration values of the x vector,
  6. go to step 1.

(g) store the results in the plant model file 40 see FIG. 2.

Having completed the equipment model calculations for a first piece of equipment, the sequential modular simulator (procedure) 32 proceeds by calling the next downstream equipment model 10 in the desired plant model/subject process plant design. Each such equipment model 10 is similarly processed by the sequential modular simulator procedure 32 one at a time, in serial downstream order.

Mode B Execution of Equipment Model 10:

When the model 10 is executed in Mode B by the digital processor 20 (i.e., simultaneous simulation/optimizer procedure 34), the model interface 26 (see FIG. 1) performs the following functions:

(a) request generation of the structural data, (b) request initialization of the model variables, (c) request the residual values for the current value of x vector, (d) request Jacobian matrix for the current value of x vector, (e) transfer the Jacobian matrix and the residuals to the solver 46.

The above actions are executed every time the simultaneous simulator/optimizer 34 of software system 30 calls the equipment model 10 during the simultaneous, iterative solution of the total plant flowsheet. When the total plant flowsheet is converged, the software system 30 calls each equipment model 10 with an instruction to store the results (i.e., values of parameters, variables and the model equations) for the model 10 in the Plant Data File 40, (FIG. 2).

Therefore, the results of the Mode A and the Mode B execution of equipment models 10 are stored in a shared data storage and can be used by subsequent Mode A and Mode B execution. Further, the equipment model 10 results are available for both the Sequential Modular Simulation procedure 32 and the Simultaneous Simulation & Optimization procedures 34 of invention software system 30.

Illustrated in FIG. 2 is the flow of data and processor control of software system 30. A user initializes software system 30 at 42 in FIG. 2, by defining the working pieces of equipment (process units) of a desired process plant design. In response software system 30 assembles a set of model equations and problem specifications for each piece of equipment. This is accomplished through the solver interface 46 which is formed of the sequential modular procedure 32 and simultaneous simulation procedure 34. Solver interface 46 calls model interface 26 to execute equipment model 10 in Mode A. This affects generation of the equipment model structural data including names of variables, names of equations defining the corresponding piece of equipment and initialization of the model variables and parameters. Similarly, the solver interface 46 through sequential modular procedure 32 defines each such equipment model 10 for the different pieces of equipment of the desired process plant design as described above in the Mode A execution of equipment model 10. That is sequential modular simulation procedure 32 executes each equipment model 10 in Mode A as described above and illustrated in FIG. 1. At this point, equipment models 10 are those models as being defined by the user through sequential modular simulation procedure 32 as illustrated at 56 in FIG. 2. The results of each such executed model 10 are stored by the model (at 56) in plant model file 40. At this point, there is considered to have been an initial simulation of the plant model.

Upon completion of sequential modular simulation procedure 32, there is an initial starting point or definition of plant conditions described by the model results and stored in plant model file 40. In turn, Optimization Solution Engine 48 of software system 30 calls simultaneous simulation/optimizer procedure 34 with the initial starting point as stored in plant model file 40. In response, simultaneous simulation/optimizer procedure 34 (within solver interface 46) assembles the total plant model equations by calling and executing (in Mode B) each equipment model 10 one at a time as described above. In particular, simultaneous simulation/optimizer procedure 34 executes each equipment model 10 as stored in the system library, as illustrated at 58 in FIG. 2. Upon convergence of the total plant equations, the equipment models 10 store the results (i.e., values of the equipment model equations, parameters and variables) in plant data file 40.

Accordingly novelty of this invention is, in part, that each equipment model 10 retrieves or stores its variables from the Plant Model File 40, the same file which is used for storing the variables computed during the sequential modular (i.e., initial) simulation. That is each equipment model is described by data independent of the solution method. Different solution methods can then be used for the same plant model. Thus, the present invention utilizes the plant model as an entity which can be accessed by and solved by different solution methods as heretofore unachieved by the prior art. Content arrangement of Plant Model File 40, as well as storage to and retrieval from File 40 is by means common in the art. Various file designs are suitable for File 40 as are in purview of one skilled in the art.

Advantages of the foregoing functionality are:

1. Sequential modular approach can be used to arrive at the solution simulation of the plant model. Such an approach allows a plant model developer to ensure the convergence by specifying a number of operating conditions as measured in the desired process plant design.
2. Solution of the sequential modular simulation is used as a starting point for the simultaneous simulation/ optimization of the entire plant model.
3. Simultaneous simulation of the entire model is required if one is to be able to optimize the plant model, thereby ensuring the maximum plant profitability.
4. Simultaneous simulation of the entire plant model is also needed to estimate model parameters from the plant operating data, thereby enabling the plant model predictions to match the plant performance.
5. Parameters estimated from the simultaneous simulation solution can subsequently be used in the sequential modular simulation for further definition of the plant model design, since the estimated parameters are also stored in the Plant Model File 40.

Equivalents

Those skilled in the art will recognize, or be able to ascertain using no more than routine experimentation, many equivalents to the specific embodiments described herein. Such equivalents are intended to be encompassed by the following claims. For example, the model equations of an equipment model 10 corresponding to a reactor would generally include energy balance equations and chemical reaction equations known in the art, and so forth for other plant equipment and corresponding equipment models 10. Other equations are in the purview of one skilled in the art.

What is claimed is:

1. Apparatus for simulating and optimizing operation of a processing plant, the processing plant including a multiplicity of equipment and a multiplicity of operating parameters for the equipment, the apparatus comprising:

a digital processor having a working memory;

a plurality of dual mode equipment models for simulating each piece of equipment in the processing plant, the plurality of equipment models collectively forming a plant model of the processing plant, there being a different equipment model for different equipment of the desired processing plant, each equipment model being formed of a set of equations and each equipment model being executed in the working memory of the digital processor in one of two modes, for a given equipment model, execution in a first mode providing numerical definition of an output stream of the corresponding equipment, and execution in a second mode providing calculation data required for iterative simultaneous solution of a total set of equations describing the plant model;

a sequential simulation routine executed by the digital processor in the working memory for sequentially executing the equipment models in the first mode and obtaining therefrom numerical definitions of output streams of each corresponding piece of equipment to simulate the desired processing plant, said simulation being an initial simulation of the processing plant and including a first set of values for operating parameters of the processing plant defining operating conditions of the plant;

an optimization and solver routine executed by the digital processor for executing the equipment models in the second mode and obtaining calculation data, the optimization and solver routine utilizing the first set of values for the operating parameters from the initial simulation and the calculation data to determine values of the operating parameters at which operating conditions of the processing plant are optimal; and a shared data storage area common to the sequential simulation routine and the optimization and solver routine for holding both (i) the first set of values for the operating parameters of the initial simulation and (ii) a second set of values of the operating parameters at which operating conditions of the processing plant are optimized as determined by the optimization routine such that the shared data storage area is common to execution of the equipment models in the first and second modes and enables the equipment models to interchange results from the first and second modes of execution in subsequent executions of the equipment models in the first and second modes.

2. Apparatus as claimed in claim 1 wherein upon the sequential simulation routine executing the equipment models in the first mode, the equipment models store the first set of values for the operating parameters in the shared data storage area, and upon the optimization routine executing the equipment models in the second mode, the equipment models store the second set of values for the operating parameters in the shared data storage area, in a manner such that the shared data storage area enables the digital processor to sequentially execute the equipment models in the first mode for a second time using the determined values of the operating parameters held in the shared data storage area from execution of the equipment models in the second mode.

3. Apparatus as claimed in claim 1 wherein the shared data storage area holds values of the operating parameters according to variable name, each operating parameter having a corresponding variable name.

4. Apparatus as claimed in claim 1 wherein the calculation data from execution of the equipment models in the second mode includes Jacobian matrixes for the equipment models and equation residuals.

5. In a digital processor, a method for simulating and optimizing a processing plant design, the plant design including a multiplicity of equipment of a desired processing plant and a multiplicity of operating parameters for the equipment, the steps comprising:

providing a plurality of dual mode equipment models for simulating each piece of equipment in the processing plant design, a different equipment model for each different equipment of the desired processing plant, each equipment model being formed of a set of equations and being executed by the digital processor in one of two modes, for a given equipment model, execution in a first mode providing numerical definition of an output stream of the corresponding equipment, and execution in a second mode providing calculation data;

sequentially executing the equipment models in the first mode and obtaining therefrom numerical definitions of output streams of each corresponding piece of equipment to simulate the desired processing plant, said simulation being an initial simulation of the processing plant and including a first set of values for operating parameters of the processing plant design;

storing the first set of values in a shared data storage area;

executing the equipment models in the second mode including utilizing from the data file the first set of values for the operating parameters from the initial simulation, to determine values of the operating parameters at which the processing plant is optimized; and storing the determined values for optimal operation of the processing plant in the shared data storage area, such that the shared data storage area is common to execution of the equipment models in the first and second modes.

6. A method as claimed in claim 5 further comprising the step of sequentially executing the equipment models in the first mode for a second time using the determined values of the operating parameters as stored in the data file from execution of the equipment models in the second mode, to further define values of the operating parameters of the processing plant design.

7. A method as claimed in claim 5 further comprising the step of interchanging results of the first and second mode executions of the equipment models through the shared data storage area in subsequent executions of the equipment models in the first and second modes.

8. A method is claimed in claim 5 wherein the steps of storing include providing each operating parameter with a variable name and storing values of the operating parameters according to respective variable name.

9. A method is claimed in claim 5 wherein the step of executing equipment models in the second mode includes defining Jacobian matrixes for the equipment models and equation residuals.

10. In a digital processor, a method for simulating and optimizing a processing plant design, the plant design including a multiplicity of equipment of a desired processing plant and a multiplicity of operating parameters for the equipment, the steps comprising:

providing a plurality of equipment models for simulating each piece of equipment in the processing plant design, a different equipment model for each different equipment of the desired processing plant, each equipment model being formed of a set of equations and being executed by the digital processor in one of two modes, for a given equipment model, execution in a first mode providing numerical definition of an output stream of the corresponding equipment, and execution in a second mode providing calculation data;

sequentially executing the equipment models in the first mode and obtaining therefrom numerical definitions of output streams of each corresponding piece of equipment to simulate the desired processing plant, said simulation being an initial simulation of the processing plant and including a first set of values for operating parameters of the processing plant design;

storing the first set of values in a data storage;

executing the equipment models in the second mode including utilizing from the data storage the first set of values for the operating parameters from the initial simulation, to determine values of the operating parameters at which the processing plant is optimized;

storing the determined values for optimal operation of the processing plant in the data storage; and sequentially executing the equipment models in the first mode for a second time using the determined values of the operating parameters as stored in the data storage from execution of the equipment models in the second mode, to further define values of the operating parameters of the processing plant design.

11. In a digital processor, a method for simulating and optimizing a processing plant design, the plant design including a multiplicity of equipment of a desired processing plant and a multiplicity of operating parameters for the equipment, the steps comprising:

providing a plurality of equipment models for simulating each piece of equipment in the processing plant design, a different equipment model for each different equipment of the desired processing plant, each equipment model being formed of a set of equations and being executed by the digital processor in one of two modes, for a given equipment model, execution in a first mode providing numerical definition of an output stream of the corresponding equipment, and execution in a second mode providing calculation data;

sequentially executing the equipment models in the first mode and obtaining therefrom numerical definitions of output streams of each corresponding piece of equipment to simulate the desired processing plant, said simulation being an initial simulation of the processing plant and including a first set of values for operating parameters of the processing plant design;

storing the first set of values in a data storage;

executing the equipment models in the second mode including utilizing from the data storage the first set of values for the operating parameters from the initial simulation, to determine values of the operating parameters at which the processing plant is optimized, said executing models in the second mode including defining Jacobian matrices for the equipment models and equation residuals; and storing the determined values for optimal operation of the processing plant in the data storage.

12. Apparatus for simulating and optimizing operation of a processing plant, the processing plant including a multiplicity of equipment and a multiplicity of operating parameters for the equipment, the apparatus comprising:

a digital processor having a working memory;

a plurality of equipment models for simulating each piece of equipment in the processing plant, the plurality of equipment models collectively forming a plant model of the processing plant, there being a different equipment model for different equipment of the desired processing plant, each equipment model being formed of a set of equations and each equipment model being executed in the working memory of the digital processor in one of two modes, for a given equipment model, execution in a first mode providing numerical definition of an output stream of the corresponding equipment, and execution in a second mode providing calculation data required for iterative simultaneous solution of a total set of equations describing the plant model;

a sequential simulation routine executed by the digital processor in the working memory for sequentially executing the equipment models in the first mode and obtaining therefrom numerical definitions of output streams of each corresponding piece of equipment to simulate the desired processing plant, said simulation being an initial simulation of the processing plant and including a first set of values for operating parameters of the processing plant defining operating conditions of the plant;

an optimization and solver routine executed by the digital processor for executing the equipment models in the second mode and obtaining calculation data, the calculation data including Jacobian matrices for the equipment models and equation residuals, the optimization and solver routine utilizing the first set of values for the operating parameters from the initial simulation and the calculation data to determine values of the operating parameters at which operating conditions of the processing plant are optimal; and a data storage common to the sequential simulation routine and the optimization and solver routine for holding both (i) the first set of values for the operating parameters of the initial simulation and (ii) a second set of values of the operating parameters at which operating conditions of the processing plant are optimized as determined by the optimization routine.

* * * * *